United States Patent
Konuskan et al.

(10) Patent No.: US 9,258,791 B2
(45) Date of Patent: Feb. 9, 2016

(54) METHOD AND DEVICE OF PERFORMING MULTI-RADIO ACCESS BEARER POWER SCALING

(71) Applicant: Telefonaktiebolaget L M Ericsson (publ), Stockholm (SE)

(72) Inventors: Cagatay Konuskan, Linköping (SE); Andreas Andersson, Landvetter (SE); Billy Hogan, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/411,965

(22) PCT Filed: Oct. 29, 2013

(86) PCT No.: PCT/SE2013/051256
§ 371 (c)(1),
(2) Date: Dec. 30, 2014

(87) PCT Pub. No.: WO2014/070081
PCT Pub. Date: May 8, 2014

(65) Prior Publication Data
US 2015/0163754 A1    Jun. 11, 2015

Related U.S. Application Data

(60) Provisional application No. 61/796,097, filed on Nov. 2, 2012.

(51) Int. Cl.
*H04B 1/00* (2006.01)
*H04B 7/00* (2006.01)
(Continued)

(52) U.S. Cl.
CPC ............ *H04W 52/36* (2013.01); *H04W 52/346* (2013.01); *H04W 52/367* (2013.01); *H04W 52/16* (2013.01); *H04W 52/287* (2013.01); *H04W 52/288* (2013.01); *Y02B 60/50* (2013.01)

(58) Field of Classification Search
CPC ............................. H04W 52/36; H04W 42/04
USPC ............................. 455/522, 59, 127.1, 67.13
See application file for complete search history.

(56) References Cited

U.S. PATENT DOCUMENTS 7,447,516 B2 * 11/2008 Heo .................... H04W 52/146
                                                        375/225
8,700,084 B2 *  4/2014 Pelletier ............... H04L 5/0007
                                                        455/444

(Continued)

FOREIGN PATENT DOCUMENTS

EP            1931160 A1    6/2008

OTHER PUBLICATIONS

3GPP, "3rd Generation Partnership Project; Technical Specification Group Radio Access Network; Medium Access Control (MAC) protocol specification (Release 11)", 3GPP TS 25.321 V11.3.0, Dec. 2012, 1-205.

(Continued)

*Primary Examiner* — Tilahun B Gesesse
(74) *Attorney, Agent, or Firm* — Murphy, Bilak & Homiller, PLLC (57) ABSTRACT

The present disclosure relates to a method and user equipment, UE, in a wireless communication network of performing power scaling on uplink transmission to a receiving radio access node, RAN. In particular, the disclosure relates to a method and user equipment for power scaling on a multi-radio access bearer, multi-RAB, wherein a Dedicated Physical Data Channel, DPDCH, and an enhanced Dedicated Physical Data Channel, E-DPDCH are configured for uplink transmission from the UE to the receiving RAN. The method comprises determining (S31) a total UE transmit power exceeding a predetermined maximum power limit value. The total UE transmit power is reduced (S32) to the predetermined maximum power limit value by reducing one or more E-DPDCH gain factors by an equal scaling factor. A DPDCH transmission status is determined (S33), whereupon a power scaling procedure is selected (S34) based on the determined DPDCH transmission status. The selected power scaling procedure is applied (S35) on the uplink transmission.

5 Claims, 5 Drawing Sheets (51) Int. Cl.
*H04B 17/00* (2015.01)
*H04W 52/36* (2009.01)
*H04W 52/34* (2009.01)
*H04W 52/16* (2009.01)
*H04W 52/28* (2009.01)

(56) References Cited

U.S. PATENT DOCUMENTS

| | | | | |
|---|---|---|---|---|
| 9,031,600 | B2* | 5/2015 | Pelletier | H04W 52/367 455/127.1 |
| 2006/0003787 | A1* | 1/2006 | Heo | H04W 52/146 455/522 |
| 2010/0273520 | A1* | 10/2010 | Pelletier | H04L 5/0007 455/522 |
| 2011/0105174 | A1* | 5/2011 | Pelletier | H04W 52/367 455/522 |
| 2011/0171991 | A1* | 7/2011 | Liu | H04W 52/286 455/522 |

OTHER PUBLICATIONS

3GPP, "3rd Generation Partnership Project; Technical Specification Group Radio Access Network; Physical layer procedures (FDD) (Release 11)", 3GPP TS 25.214 V11.3.0, Sep. 2012, 1-110.

Unknown, Author, "On power scaling in Multi-RAB", 3GPP TSG-RAN1 Meeting #71, R1-125251, Ericsson, ST-Ericsson, New Orleans, Louisiana, USA, Nov. 12-16, 2012, 1-3.

* cited by examiner

METHOD AND DEVICE OF PERFORMING MULTI-RADIO ACCESS BEARER POWER SCALING

TECHNICAL FIELD

The present disclosure relates to a method and user equipment, UE, in a wireless communication network of performing power scaling on uplink transmission to a receiving radio access node, RAN. In particular, the disclosure relates to a method and user equipment for power scaling on a multi-radio access bearer, multi-RAB, wherein a Dedicated Physical Data Channel, DPDCH, and an enhanced Dedicated Physical Data Channel, E-DPDCH are configured for uplink transmission from the UE to the receiving RAN.

BACKGROUND

Figure 1:
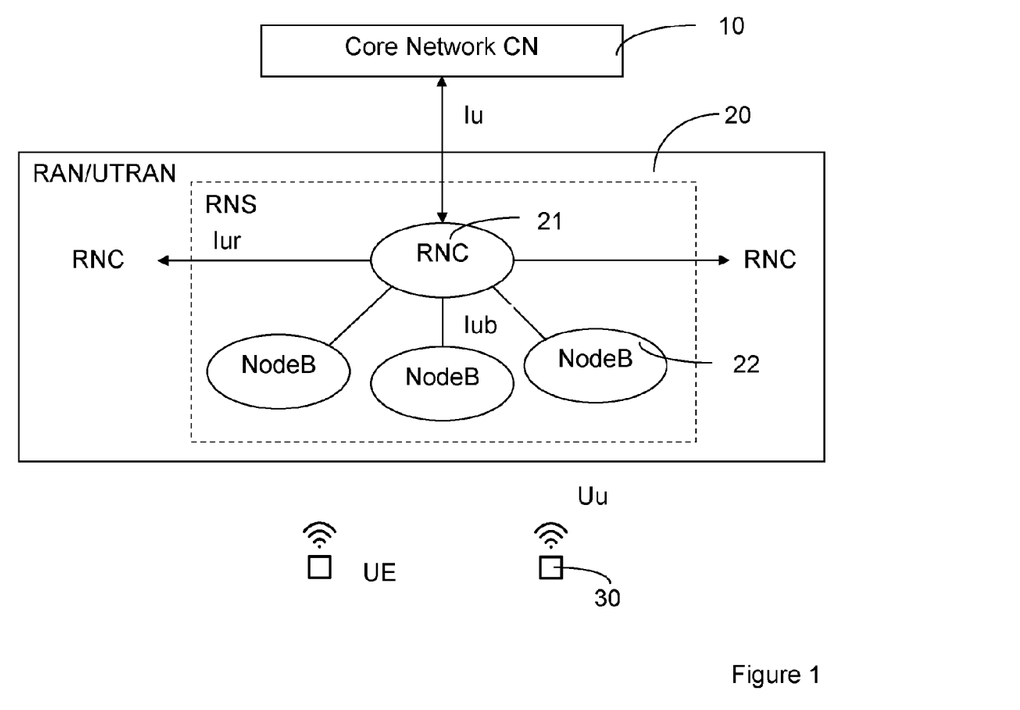
FIG. 1 schematically illustrates a Universal Mobile Telecommunications Systems, UMTS, network.

One example cellular communications system is Universal Mobile Telecommunications Systems, UMTS, Wideband Code Division Multiple Access, W-CDMA. Wireless communication systems following UMTS technology, were developed as part of Third Generation, 3G, Radio Systems, and is maintained by the Third Generation Partnership Project, 3GPP. A mobile radio communication system, such as a UMTS type system, includes a mobile radio communication network communicating with wireless devices, also known as mobile terminals or user equipments, UEs and with external networks. The UMTS network architecture includes a Core Network, CN, interconnected with a UMTS Terrestrial Radio Access Network, UTRAN, via an Iu interface. The UTRAN is configured to provide wireless telecommunication services to users through mobile radio terminals, referred to as user equipments, UEs, in the 3GPP standard, via a Uu radio interface. A commonly employed air interface defined in the UMTS standard is W-CDMA. The UTRAN has one or more radio network controllers, RNC, and base stations, referred to as Node Bs by 3GPP, which collectively provide for the geographic coverage for wireless communications with UEs. Uplink, UL, communications refer to transmissions from UE to Node B, and downlink, DL, communications refer to transmissions from Node B to UE. One or more Node Bs are connected to each RNC via an Iub interface; RNCs within a UTRAN communicate via an Iur interface. An example block diagram of an UMTS WCDMA is shown in FIG. 1.

Radio transmitters are generally limited in total transmit power, a limit imposed by regulatory agencies or by the battery or power amplifier technology. This power limitation may result in reduced radio coverage. For example, as user equipment, UE, moves away from its Node B base station, it typically increases its transmission power to maintain the same level of quality at the base station. The UE output power is controlled by the Node B base station via one or more power control loops. When the UE reaches a maximum power and may no longer increase its power to maintain the signal quality desired at the base station, power scaling is applied. This may occur for example when the UE is close to cell-edge, or when the UE enters a region of deep signal fade.

Mobile networks with High Speed Packet Access, HSPA, include High Speed Downlink Packet Access, HSDPA, and High Speed Uplink Packet Access, HSUPA, or Enhanced Uplink, EUL. The enhanced uplink introduces two new code-multiplexed uplink physical channels: an enhanced data channel, E-DCH Dedicated Physical Data Channel, E-DPDCH, and an enhanced control channel, E-CCH Dedicated Physical Control Channel, E-DPCCH. In EUL, the Dedicated Physical Control Channel, DPCCH, carries pilot, power control, and Inner Loop Power Control, ILPC, information. The transport format of EUL is designated as E-DCH Transport Format Combination, E-TFC. A standard E-TFC table is set forth in 3GPP specification 25.321. A transmit power gain factor named $\beta_{ed}$ is used to indicate the enhanced data channel E-DPDCH amplitude for each E-TFC in the table, and a transmit power gain factor named $\beta_{ec}$ is used to indicate the amplitude of E-DPCCH. The power level of the DPDCH is indicated by $\beta_d$ for each transport format, and the parameter $\beta_c$ is used to indicate the DPCCH transmit power level. A predetermined small minimum transmit power level of E-DPDCH is specified using $\beta_{ed}$, min in the 3GPP specification 25.214. In the uplink, DPCCH is used as a power reference with the power offset of all the other physical channels being defined relative to the DPCCH power.

Figure 2:
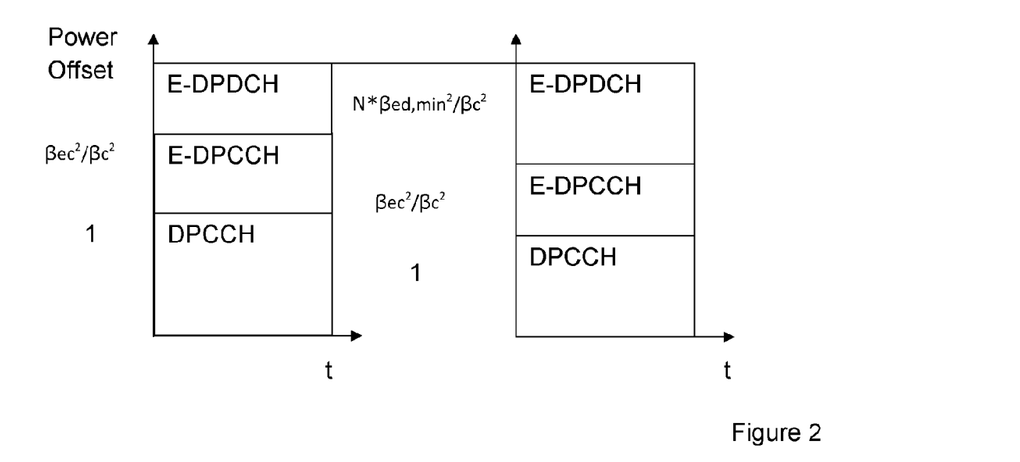
FIG. 2 illustrates power allocation for enhanced uplink, EUL.

A configurable transmit power gain factor $\beta_{ed}$, min avoids excessive downscaling of the data channel E-DCH power by setting a minimum power level for the E-DCH. The configurable $\beta_{ed}$, min permits a better trade-off of the power allocation between the E-DCH and the DPCCH control channel during UE power limitation, which in turn improves the EUL coverage. FIG. 2 illustrates power allocated for E-DCH with and without a configurable $\beta_{ed}$, min.

TS 25.214, "Physical layer procedures (FDD)", ver. 11.3.0, 2012 Sep. 19, describes current 3GPP power scaling. In subsection 5.1.2.6, power scaling handling when a UE is power limited is described. Subsection 5.1.2.6 sets forth different power scaling procedures which are applied depending on if DPDCH is configured or not, and if E-DCH configured or not. Here, the term "configured" means that physical channel radio resources are reserved for transmission. The configuration when E-DCH is not configured and DPDCH is configured is from now on referred to as configuration 1. The configuration when E-DCH is configured and DPDCH is not configured is from now on referred to as configuration 2. The configuration when both E-DCH and DPDCH are configured is from now on referred to as configuration 3. To say that E-DCH is configured means that one or more E-DPDCH(s) physical channel resources are reserved for uplink transmission from user equipment, UE, to NodeB. Similarly, to say that DPDCH is configured means that one or more DPDCH(s) physical channel resources are reserved for transmission from user equipment, UE, to NodeB.

In the power scaling applied for configuration 1, the power scaling procedures inform the UE, after applying DPCCH power adjustments and gain factors, to apply additional scaling to the total transmit power so that it is equal to the maximum allowed power. DPCCH/DPDCH and DPCCH/HS-DPCCH power ratios are maintained.

In the power scaling applied for configurations 2 and 3 where E-DCH is configured, the user equipment, UE, after applying DPCCH power adjustments and gain factors, first reduces all the E-DPDCH gain factors $\beta_{ed,k}$ by an equal scaling factor to respective values $\beta_{ed,k,reduced}$ so that the total transmit power is equal to the maximum allowed power. Then, power scaling procedures differ depending on whether a DPDCH is configured. In the power scaling applied for configuration 2, where DPDCH is not configured, the power scaling follows a procedure which, depending on a network-configurable transmit power gain factor $\beta_{ed,min}$ sets a limit on how much the user equipment may scale down the E-DPDCH gain factors $\beta_{ed,k}$. At this point, if the user equipment, UE, transmit power still exceeds the maximum allowed transmit power limit, equal scaling is applied to all channels, similar to what is done for the power scaling applied for configuration 1. This procedure gives the network control over a relative lower bound of the E-DPDCH gain factors $\beta_{ed,k}$ and in turn improves the EUL coverage as described above.

In power scaling applied for configuration 3 where DPDCH also is configured, the power scaling procedure allows downscaling of E-DPDCH gain factors $\beta_{ed,k}$,reduced down to the "smallest quantized $\beta_{ed,k}$ value" (see the definition in TS 25.214, "Physical layer procedures (FDD)", ver. 11.3.0, 2012-Sep.-19). If $\beta_{ed,k}$,reduced is lower than the "smallest quantized $\beta_{ed,k}$ value," then discontinuous transmission, DTX, of the E-DPDCH(s) is(are) allowed. The DTX procedure secures performance of DPDCH traffic over E-DCH traffic.

EP 1 931 160 A1 relates to a mobile station and communications method. A transmit power control process carried out by the mobile station is disclosed. When an estimated total transmit power is exceeds a Pmax value, a gain factor of E-DPDCH is reduced so as to reduce the total transmit power. 'Additional channel transmit power scaling'-regions are disclosed where additional channel transmit power scaling is applied in states in which DPDCH data are transmitted.

However, the current 3GPP power downscaling procedures has a negative impact on DCH performance and causes un-due power scaling of E-DCH traffic.

SUMMARY

The present disclosure relates to user equipment transmit power control and provides a more adequate multi-RAB power scaling configuration. It is an object of the present disclosure to provide a method and user equipment that solves the problem of un-due power scaling of E-DCH traffic transmitted in a multi-RAB configuration where a Dedicated Physical Data Channel, DPDCH, is also configured. The disclosed method enables an improved power scaling for multi-RAB.

The present disclosure presents a method in a user equipment, UE, in a wireless communication network of performing power scaling on uplink transmission to a receiving radio access node, RAN, on a multi-radio access bearer, multi-RAB. A Dedicated Physical Data Channel, DPDCH, and an enhanced Dedicated Physical Data Channel, E-DPDCH are configured for uplink transmission from the UE to the receiving RAN. The method comprises determining a total UE transmit power exceeding a predetermined maximum power limit value. The total UE transmit power is reduced to the predetermined maximum power limit value by reducing one or more E-DPDCH gain factors by an equal scaling factor. A DPDCH transmission status is determined, whereupon a power scaling procedure is selected based on the determined DPDCH transmission status. The selected power scaling procedure is applied on the uplink transmission.

The disclosed method provides the advantage of enabling a more situational correct power setting for multi-RAB. It is a significant advantage of the disclosure that it provides a power scaling procedure adapted to a DPDCH transmission status; so selection of power scaling procedure is based on the DPDCH transmission status.

According to an aspect of the disclosure, a first power scaling procedure is selected when the DPDCH transmission status reveals that data is transmitted on the DPDCH. Consequently, the disclosed method provides the advantage of enabling selection of a power scaling procedure specifically adapted to the situation when a DPDCH is transmitted.

According to a further aspect of the disclosure, a first power scaling procedure is selected that complies with a legacy 3GPP power scaling procedure used for power scaling when a DPDCH is configured. Reuse of a legacy power scaling procedure provides the advantage of a straight-forward and simple implementation of the disclosed method.

According to an aspect of the disclosure, a second power scaling procedure is selected when the when the DPDCH transmission status reveals that data is not transmitted on the DPDCH. In multi-RAB situations where both DPDCH and E-DPDCH are configured, but DPDCH is not transmitted, it is a significant advantage to provide a power scaling procedure adapted for only E-DPDCH traffic. Such a power scaling procedure enables an improved E-DPDCH traffic coverage.

According to a further aspect of the disclosure, a second power scaling procedure is selected that complies with a legacy 3GPP power scaling procedure used for power scaling when a DPDCH is not configured. Reuse of a legacy power scaling procedure provides the advantage of a straight-forward and simple implementation of the disclosed method.

According to an aspect of the disclosure, the method is performed in a user equipment operative in a wideband code division multiple access, W-CDMA, Universal Mobile Telecommunications Systems, UMTS. It is advantageous to implement the method in a user equipment operative in W-CDMA UMTS, since the W-CDMA UMTS provides legacy 3GPP power scaling procedures applicable as the first or second power scaling procedure.

The present disclosure also presents a user equipment, UE, for a wireless network, the UE being configured for performing power scaling on uplink transmission to a receiving radio access node, RAN, on a multi-radio access bearer, multi-RAB. A Dedicated Physical Data Channel, DPDCH, and an enhanced Dedicated Physical Data Channel E-DPDCH are configured for uplink transmission from the UE to the receiving RAN. The UE comprises a radio transceiving circuitry and an enhanced uplink, EUL, processor. The EUL processor comprises a UE transmission power determining entity configured to determine when a total UE transmit power exceeds a predetermined maximum power limit value. A UE power reduction entity is configured to reduce the total UE transmit power to the predetermined maximum value by reducing one or more E-DPDCH gain factors by an equal scaling factor. A DPDCH transmission status is determined in a DPDCH transmission determining entity, whereupon a power scaling entity is configured to select a power scaling procedure based on the determined DPDCH transmission. The power scaling entity is also configured to apply the selected power scaling procedure on uplink transmission from the radio transceiving circuitry.

According to an aspect of the disclosure, the power scaling entity is configured to select a first power scaling procedure when the DPDCH transmission status reveals that data is transmitted on the DPDCH.

According to a further aspect of the disclosure, the first power scaling procedure complies with a legacy 3GPP power scaling procedure for power scaling when a DPDCH is configured.

According to another aspect of the disclosure, the power scaling entity is configured to select a second power scaling procedure when the DPDCH transmission status reveals that data is not transmitted on the DPDCH.

According to a further aspect, the second power scaling procedure complies with a legacy 3GPP power scaling procedure for power scaling when a DPDCH is not configured.

According to an aspect of the disclosure, the user equipment, UE, is operative in a wideband code division multiple access, W-CDMA, Universal Mobile Telecommunications Systems, UMTS.

The present disclosure also relates to a computer program, comprising computer readable code which, when run on user equipment, UE, causes the user equipment to perform the method disclosed above and below.

With the above in mind, the object of the present disclosure is to overcome at least some of the disadvantages of known technology as described above and below.

BRIEF DESCRIPTION OF THE DRAWINGS

FIG. 4
a. is a flow chart illustrating a first power scaling procedure;
b. is a flow chart illustrating a second power scaling procedure;

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein. Hardware implementation may include or encompass, without limitation, digital signal processor, DSP, hardware, a reduced instruction set processor, hardware (e.g., digital or analog) circuitry including but not limited to application specific integrated circuits, ASIC, and/or field programmable gate array(s), FPGA, and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment, UE, it should be understood by the person skilled in the art that UE is a non-limiting term comprising any wireless device or node equipped with a radio interface allowing for at least one of: transmitting signals in the uplink, UL, and receiving and/or measuring signals in the downlink, DL. Some examples of UE in its most general sense are a PDA, laptop, mobile, sensor, fixed relay, mobile relay, and a radio network node, e.g. a small base station using the terminal technology.

FIG. 1 illustrates an example block diagram of UMTS network architecture. The network architecture includes a Core Network 10, CN, interconnected with a UMTS Terrestrial Radio Access Network 20, UTRAN, via an Iu interface. The UTRAN 20 is configured to provide wireless telecommunication services to users through mobile radio terminals, referred to as user equipments 30, UEs, in the 3GPP standard, via a Uu radio interface. A commonly employed air interface defined in the UMTS standard is W-CDMA. The UTRAN has one or more radio network controllers 21, RNC, and base stations 22, referred to as Node Bs by 3GPP, which collectively provide for the geographic coverage for wireless communications with UEs 30. Uplink, UL, communications refer to transmissions from UE to Node B, and downlink, DL, communications refer to transmissions from Node B to UE. One or more Node Bs 22 are connected to each RNC 21 via an Iub interface; RNCs within a UTRAN communicate via an Iur interface. The technology in this disclosure relates to the radio interface Uu between a NodeB 22, and a UE 30.

As previously discussed, the UE radio transmitters are limited in total transmit power. As a UE 30 moves away from a Node B 22 to which the UE is attached, it increases its transmission to maintain the same level of quality at the base station. The UE 30 output power is controlled by the NodeB 22. When the UE 30 reaches a maximum power and no longer has the ability to increase its power to maintain the signal quality desired at the base station, power scaling is applied. Exemplary situations of such power scaling include the situation when a UE 30 is close to a cell edge or when the UE 30 reaches a region of deep signal fade.

FIG. 2 illustrates power allocation for Enhanced Uplink, EUL, in a mobile network with High Speed Packet Access, HSPA. Power scaling for E-DCH with a configurable Bed, min is illustrated on the right-hand side. EUL introduced two new code-multiplexed uplink physical channels: an enhanced Data Channel, E-DCH, enhanced Dedicated Physical Data Channel, E-DPDCH and an enhanced Control Channel, E-DCH, enhanced Dedicated Physical Control Channel, E-DPCCH. In EUL, the Dedicated Physical Control Channel, DPCCH carries pilot, power control and Inner Loop Power Control (ILPC) information. A transmit power gain factor named Bed is used to indicate the enhanced data channel E-DPDCH amplitude for each E-DCH transport format combination. A transmit power gain factor βec is used to indicate the amplitude of E-DPCCH. The power level of DPDCH is indicated by βd for each transport format and the parameter βc is used to indicate the DPCCH transmit power level. In the 3GPP specification 25.214, a predetermined minimum transmit power level of E-DPDCH is specified as βed,min. In the uplink, DPCCH is used as a power reference with the power offset of all the other physical channels being defined relative to the DPCCH power. The use of a configurable transmit power gain factor Bed, min avoids excessive downscaling of the data channel E-DCH power. The configurable Bed, min permits a better trade of between the power allocation between the E-DCH and DPCCH control channel during UE power limitation/scaling. The 3GPP specification 25.214 "Physical layer procedures (FDD)", ver. 11.3.0, 2012 Sep. 19 describes legacy 3GPP power scaling in detail. Subsection 5.1.2.6 discloses power scaling procedures that are applied depending on if DPDCH is configured or not, and if E-DCH is configured or not. The term configured here applies to the situation where physical channel radio resources have been reserved for transmission. These legacy power scaling procedures will be described below with reference to FIGS. 4a and 4b.

Figure 3:
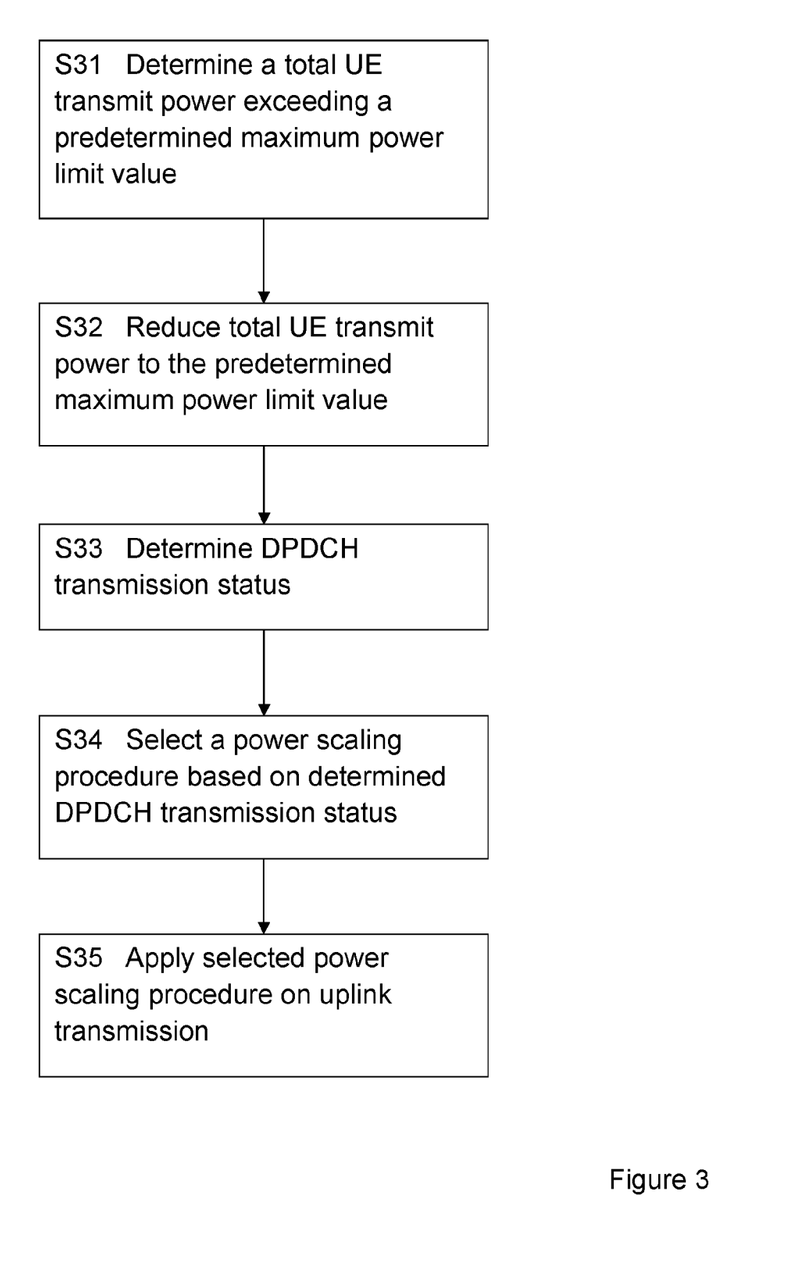
FIG. 3 is a flow chart illustrating exemplary method steps for performing multi-radio access bearer power scaling in a user equipment.

FIG. 3 discloses a flow chart illustrating exemplary method steps for performing multi-radio access bearer power scaling in a user equipment, UE. The user equipment is configured to perform the power scaling method steps for uplink transmission to a receiving radio access node, RAN/UTRAN, in a wireless communication network on a multi-radio access bearer, multi-RAB. The disclosed power scaling procedure is applicable when E-DCH is configured; thus for Enhanced Uplink, EUL, in a mobile network with High Speed Packet Access, HSPA. A Dedicated Physical Data Channel, DPDCH, and an enhanced Dedicated Physical Data Channel, E-DPDCH are configured for uplink transmission from the UE to the receiving RAN.

In a first step S31, the UE determines that the total UE transmit power exceeds a predetermined maximum power limit value. The total UE transmit power level is an instantaneous level where the UE transmit power of all channels together exceeds a limit, over e.g. a slot that is a period of 0.67 ms). The instantaneous level is defined in current 3GPP specifications, e.g. the referenced 3GPP 25.214 specification. The determining in the UE follows on receipt of power control information from the NodeB, instructing the UE that power control must be exercised. This is part of legacy procedures, e.g as described in the referenced 3GPP specification 25.214, and will not be discussed herein.

In a first power reduction step S32, the UE reduces total UE transmit power to the predetermined maximum power limit value. Reduction of total UE transmit power includes applying DPCCH power adjustments and gain factors. Subsequently, the UE reduces all the E-DPDCH gain factors $\beta ed,k$ by an equal scaling factor to respective values $\beta ed,k$, reduced so that the total UE transmit power is equal to the maximum allowed power. A UE DPDCH transmission status is determined in step S33 whereupon selection S34 of a power scaling procedure is based on the determined DPDCH transmission status. Following selection of a power scaling procedure, power scaling according to the procedure is applied to the uplink transmission.

Selection of the power scaling procedure differs depending on whether a DPDCH is transmitted or not, i.e. if data is transmitted on the configured DPDCH. A first power scaling procedure is applied when the DPDCH transmission status reveals that a DPDCH is transmitted, while a second power scaling procedure is selected when the DPDCH transmission status reveals that a DPDCH is not transmitted, i.e. if the channel is simply allocated without sending data.

Legacy power scaling procedures are applicable for the selection of the first and second power scaling procedures. With a selection of legacy procedures, the disclosure provides a very straight-forward implementation while still offering significant advantages in that it enables a more situational correct power setting for multi-RAB. Hence, if data is transmitted on the DPDCH the power scaling procedure corresponding to a DPDCH being configured is executed and vice versa.

In the power scaling applied for the transmission status where DPDCH is transmitted, the power scaling follows a procedure which, depending on a network-configurable transmit power gain factor $\beta ed$, min sets a limit on how much the UE scales down the E-DPDCH gain factors $\beta ed,k$.

In the power scaling applied for the transmission status where DPDCH is not transmitted, the power scaling procedure allows downscaling of E-DPDCH gain factors $\beta ed,k$ reduced down to the "smallest quantized $\beta ed,k$ value" according to the definition in TS 25.214 "Physical layer procedures (FDD)", ver. 11.3.0, 2012 Sep. 19). If $\beta ed,k$ reduced is lower than the "smallest quantized $\beta ed$,value" then discontinuous transmission, DTX, of the one or more E-DPDCH is allowed. The DTX procedure secures performance of DPDCH traffic over E-DCH traffic.

Figure 4A:
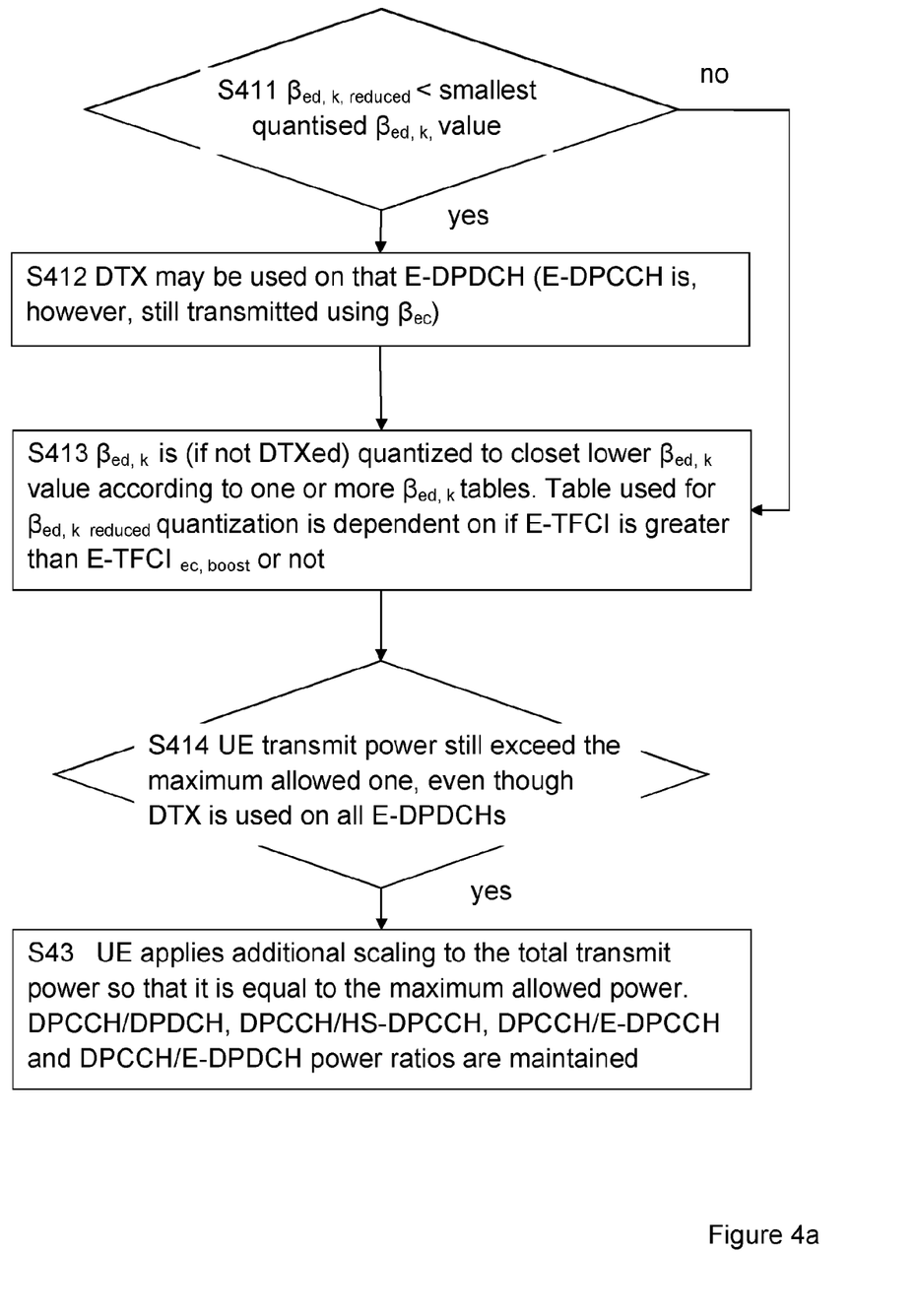
Figure 4B:
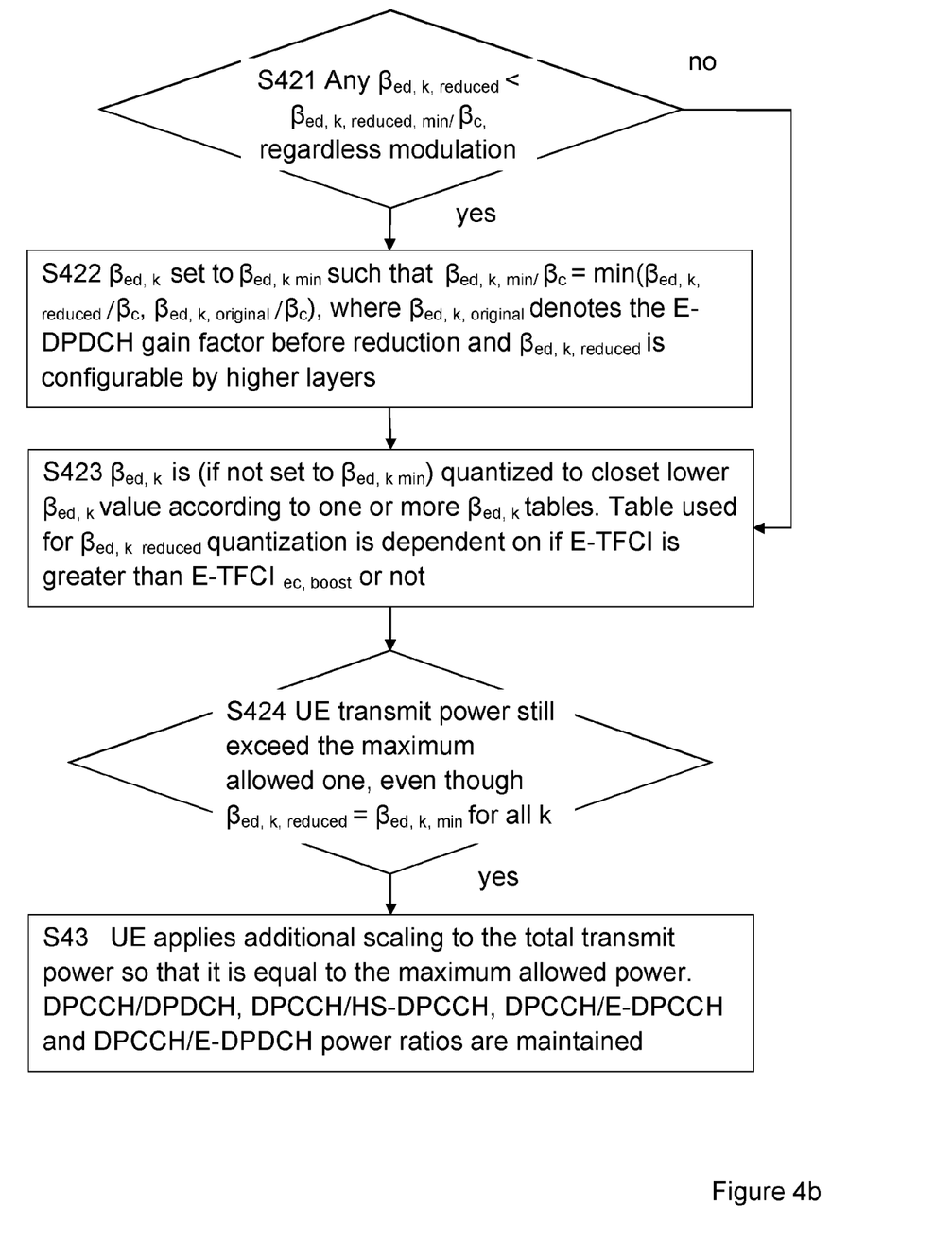

The power scaling procedures illustrated in FIGS. 4a and 4b correspond to procedures presented in 3GPP standard TS 25.214 and in particular in section 5.1.2.6 disclosing the conditions for applying or not applying power scaling for E-DCH only transmissions.

FIG. 4a illustrates the power scaling procedure applicable when an E-DCH is configured and a DPDCH is transmitted. The illustrated power scaling procedure represents an exemplary first power scaling procedure as mentioned above. In a first step S411, an evaluation is performed if any $\beta ed,k$,reduced/$\beta c$ is less than the smallest quantized $\beta ed,k$ value in one or more $\beta ed,k$ tables (e.g table 1B.2 as defined in said 3GPP standard TS 25.214). In a subsequent step S412, DTX is used on the E-DPDCH, when the evaluation in S411 provides the result that $\beta ed,k$, reduced/$\beta c$ is less than the smallest quantized $\beta ed,k$ value. Consequently if not DTXed, $\beta ed,k$ is consequently quantized in step S413 to closet lower $\beta ed,k$ value according to the one or more $\beta ed,k$ tables. The table used for $\beta ed,k$, reduced quantization is dependent on if E-TFCI is greater than E-TFCI ec, boost or not. When the UE transmit power in step S414 is found to still exceed the maximum allowed transmit power, even though DTX is used on all E-DPDCHs, the first power scaling procedure involves the UE applying additional scaling to the total transmit power so that it is equal to the maximum allowed power while maintaining the power ratio between DPCCH and DPDCH, between DPCCH and HS-DPCCH, between DPCCH and E-DPCCH, and between DPCCH and E-DPDCH as illustrated in step S43.

FIG. 4b illustrates the power scaling procedure applicable when an E-DCH is configured and a DPDCH is not transmitted. The illustrated power scaling procedure represents an exemplary second power scaling procedure as mentioned above. In a first step S421, an evaluation is performed if any $\beta ed,k$ reduced is less than any $\beta ed,k$,reduced,min/$\beta c$ regardless of modulation. If that is the case, $\beta ed,k$ is set to $\beta ed,k$,min so that $\beta ed,k$,min/$\beta c$ equals the minimum value of $\beta ed,k$, reduced,min/$\beta c$ and $\beta ed,k$,original/$\beta c$ where $\beta ed,k$, original denotes the E-DPDCH gain factor before reduction and $\beta ed,k$,reduced,min is configurable by higher layers in step S422. When $\beta ed,k$ is not set to $\beta ed,k$,min; $\beta ed,k$ is consequently quantized in step S423 to closet lower $\beta ed,k$ value according to the one or more $\beta ed,k$ tables. The table used for $\beta ed,k$, reduced quantization is dependent on if E-TFCI is greater than E-TFCI ec, boost or not. When the UE transmit power in step S424 is found to still exceed the maximum allowed transmit power, even though $\beta ed,k$, reduced equals $\beta ed,k$, min for all values of k, the second power scaling procedure involves the UE applying additional scaling to the total transmit power so that it is equal to the maximum allowed power while maintaining the power ratio between DPCCH and DPDCH, between DPCCH and HS-DPCCH, between DPCCH and E-DPCCH, and between DPCCH and E-DPDCH as illustrated in step S43, i.e., the additional power scaling previously disclosed for the first power scaling procedure of FIG. 4a.

Figure 5:
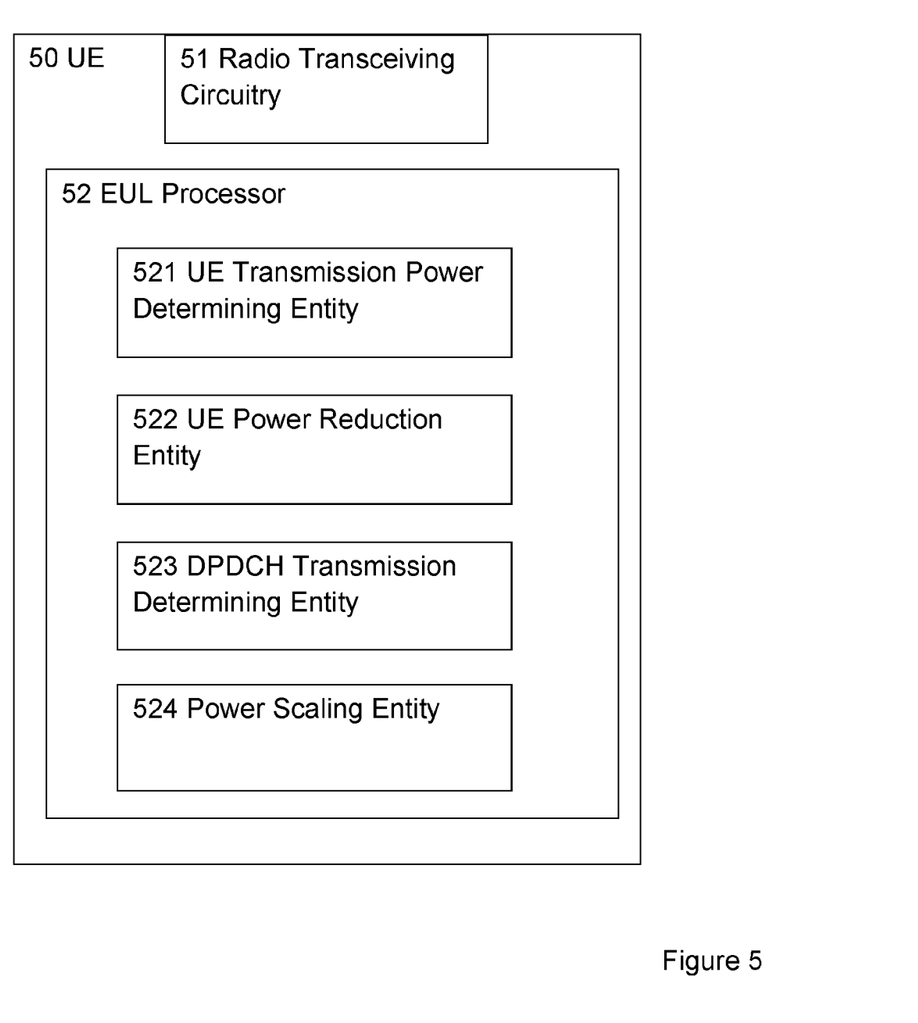
FIG. 5 is a block diagram schematically illustrating a user equipment embodiment.

FIG. 5 shows a non-limiting exemplary block diagram of a user equipment 50, the UE being configured for performing power scaling on uplink transmission to a receiving radio access node RAN/UTRAN, on a multi-radio access bearer, multi-RAB. A Dedicated Physical Data Channel, DPDCH, and an enhanced Dedicated Physical Data Channel E-DPDCH are configured for uplink transmission from the UE to the receiving RAN. The user equipment 50 comprises a radio transceiving circuitry 51 and an enhanced uplink, EUL processor 52. A UE transmission power determining entity 521 in the EUL processor is configured to determine when a total UE transmit power exceeds a predetermined maximum power limit value. The EUL processor further comprises a UE power reduction entity 522 configured to reduce the total UE transmit power to the predetermined maximum value by reducing one or more E-DPDCH gain factors by an equal scaling factor. A DPDCH transmission determining entity 523 in the EUL processor is configured to determine a DPDCH transmission status; and, a power scaling entity 524 is configured to select a power scaling procedure based on the determined DPDCH transmission and to apply the selected power scaling procedure. The EUL processor also comprises the one or more $\beta ed,k$ tables used in the performance of the power scaling procedures as described with reference to FIGS. 4a and b.

The above technology has been presented with reference to an implementation in the 3GPP standard TS 25.214, "Physical layer procedures (FDD)", ver. 11.3.0 2012 Sep. 19. However, the disclosure is not limited to such an implementation; any implementation covered by the claim language is intended to fall within the scope of the disclosure.

Although the description above contains many specifics, they should not be construed as limiting but as merely providing illustrations of some presently preferred example embodiments. For example, non-limiting, example embodiments of the technology were described in a WCDMA UMTS context. But the principles of the technology described may also be applied to other radio access technologies. Indeed, the technology fully encompasses other embodiments which may become apparent to those skilled in the art. Reference to an element in the singular is not intended to mean one and only one unless explicitly so stated, but rather "one or more." None of the above description should be read as implying that any particular element, step, range, or function is essential.

The invention claimed is:

1. A method in a user equipment, UE, in a wireless communication network of performing power scaling on uplink transmission to a receiving radio access node, RAN, on a multi-radio access bearer, multi-RAB, wherein a Dedicated Physical Data Channel, DPDCH, and an enhanced Dedicated Physical Data Channel, E-DPDCH are configured for uplink transmission from the UE to the receiving RAN, comprising:
    determining a total UE transmit power exceeding a predetermined maximum power limit value;
    reducing total UE transmit power to the predetermined maximum power limit value by reducing one or more E-DPDCH gain factors by an equal scaling factor;
    determining a DPDCH transmission status;
    selecting a power scaling procedure based on the determined DPDCH transmission status; and
    applying the selected power scaling procedure on the uplink transmission;
    wherein a first power scaling procedure is selected when the DPDCH transmission status reveals that data is transmitted on the DPDCH, and a second power scaling procedure is selected when the step of determining DPDCH transmission status reveals that data is not transmitted on the DPDCH.

2. The method of claim 1, wherein the wireless communication network is a Universal Mobile Telecommunications Systems, UMTS, wideband code division multiple access, W-CDMA, network.

3. A user equipment, UE, configured for operation in a wireless communication network, the UE being further configured to perform power scaling on uplink transmission to a receiving radio access node, RAN, on a multi-radio access bearer, multi-RAB, wherein a Dedicated Physical Data Channel, DPDCH, and an enhanced Dedicated Physical Data Channel E-DPDCH are configured for uplink transmission from the UE to the receiving RAN, the UE comprising:
    radio transceiver circuitry; and
    a processing circuit associated with the radio transceiver and configured to:
    determine when a total UE transmit power exceeds a predetermined maximum power limit value;
    reduce the total UE transmit power to the predetermined maximum value by reducing one or more E-DPDCH gain factors by an equal scaling factor;
    determine a DPDCH transmission status; and, a power scaling entity configured to select a power scaling procedure based on the determined DPDCH transmission status; and
    apply the selected power scaling procedure on uplink transmission from the radio transceiving circuitry;
    wherein the processing circuit is further configured to select a first power scaling procedure when the DPDCH transmission status reveals that data is transmitted on the DPDCH, and select a second power scaling procedure when the DPDCH transmission status reveals that data is not transmitted on the DPDCH.

4. The user equipment, UE, of claim 3, wherein the wireless communication network is a Universal Mobile Telecommunications Systems, UMTS, wideband code division multiple access, W-CDMA, network.

5. A non-transitory computer-readable medium storing a computer program comprising computer program instructions that, when executed by a processor circuit in a user equipment, UE, configured for operation in a wireless communication network, cause the UE to perform power scaling on uplink transmission to a receiving radio access node, RAN, on a multi-radio access bearer, multi-RAB, wherein a Dedicated Physical Data Channel, DPDCH, and an enhanced Dedicated Physical Data Channel, E-DPDCH are configured for uplink transmission from the UE to the receiving RAN, said computer program instructions including instructions causing the UE to:
    determine a total UE transmit power exceeding a predetermined maximum power limit value;
    reduce total UE transmit power to the predetermined maximum power limit value by reducing one or more E-DPDCH gain factors by an equal scaling factor;
    determine a DPDCH transmission status;
    select a power scaling procedure based on the determined DPDCH transmission status; and
    apply the selected power scaling procedure on the uplink transmission;
    wherein the computer program further includes program instructions to cause the UE to select a first power scaling procedure when the DPDCH transmission status reveals that data is transmitted on the DPDCH, and to select a second power scaling procedure when the operation of determining DPDCH transmission status reveals that data is not transmitted on the DPDCH.

* * * * *

UNITED STATES PATENT AND TRADEMARK OFFICE
CERTIFICATE OF CORRECTION

PATENT NO.        : 9,258,791 B2
APPLICATION NO.   : 14/411965
DATED             : February 9, 2016
INVENTOR(S)       : Konuskan et al.

Page 1 of 1

It is certified that error appears in the above-identified patent and that said Letters Patent is hereby corrected as shown below:

In the Specification

In Column 6, Line 42, delete "Bed," and insert -- βed, --, therefor.

In Column 6, Line 51, delete "Bed" and insert -- βed --, therefor.

In Column 6, Line 62, delete "Bed," and insert -- βed, --, therefor.

In Column 6, Line 63, delete "Bed," and insert -- βed, --, therefor.

In Column 9, Lines 39-40, delete "one and only one" and insert -- "one and only one" --, therefor.

Signed and Sealed this
Sixteenth Day of August, 2016

Michelle K. Lee
*Director of the United States Patent and Trademark Office*